(12) United States Patent
Wilson et al.

(10) Patent No.: US 11,757,111 B2
(45) Date of Patent: Sep. 12, 2023

(54) FOUR-FLUID BIPOLAR PLATE FOR FUEL CELL

(71) Applicant: NIMBUS POWER SYSTEMS LLC, Groton, CT (US)

(72) Inventors: Matthew P. Wilson, Groton, CT (US); Michael E. Gorman, Wellesley, MA (US); Samuel J. Angles, Groton, CT (US)

(73) Assignee: NIMBUS POWER SYSTEMS, INC., Groton, CT (US)

( * ) Notice: Subject to any disclaimer, the term of this patent is extended or adjusted under 35 U.S.C. 154(b) by 0 days.

(21) Appl. No.: 17/863,324

(22) Filed: Jul. 12, 2022

(65) Prior Publication Data

US 2022/0399553 A1 Dec. 15, 2022

Related U.S. Application Data

(63) Continuation of application No. 17/344,377, filed on Jun. 10, 2021, now Pat. No. 11,424,460.

(51) Int. Cl.
*H01M 8/04119* (2016.01)
*H01M 8/04029* (2016.01)
*H01M 8/0258* (2016.01)

(52) U.S. Cl.
CPC ..... *H01M 8/04134* (2013.01); *H01M 8/0258* (2013.01); *H01M 8/04029* (2013.01); *H01M 2250/10* (2013.01)

(58) Field of Classification Search
None
See application file for complete search history.

(56) References Cited

U.S. PATENT DOCUMENTS

| 5,262,249 | A | 11/1993 | Beal et al. |
| 7,135,247 | B2 | 11/2006 | Meyers et al. |
| 7,638,217 | B2 | 12/2009 | Darling et al. |
| 7,687,175 | B2 | 3/2010 | Abd Elhamid et al. |
| 8,795,909 | B2 | 8/2014 | Darling et al. |
| 9,570,763 | B2 | 2/2017 | Carnevale et al. |
| 11,424,460 | B1* | 8/2022 | Wilson .............. H01M 8/04029 |
| 2003/0124410 | A1* | 7/2003 | Yi ....................... H01M 8/2457 |
| | | | 429/443 |
| 2005/0064261 | A1 | 3/2005 | Breault et al. |
| 2005/0118490 | A1 | 6/2005 | Sano et al. |
| 2009/0035616 | A1* | 2/2009 | Darling .............. H01M 8/0258 |
| | | | 429/429 |
| 2014/0329168 | A1 | 11/2014 | Dang et al. |
| 2016/0240869 | A1* | 8/2016 | Eschenbach ...... H01M 8/04828 |
| 2020/0119371 | A1 | 4/2020 | Gu et al. |
| 2020/0185733 | A1* | 6/2020 | Ryu .................. H01M 8/04074 |

* cited by examiner

*Primary Examiner* — Alix E Eggerding
(74) *Attorney, Agent, or Firm* — Barry F. Manna

(57) ABSTRACT

A bipolar plate for a four-fluid fuel cell includes a nonporous sub-plate and a porous sub-plate. The nonporous sub-plate includes a water management side, an opposing reactant side, and an internal coolant passage therebetween. The porous sub-plate includes a reactant side and an opposing water management side. The reactant side includes a first reactant flow field, and the water management side is fluidly connected to the water management side of the nonporous sub-plate. Embodiments of the invention include a method to operate the four-fluid fuel cell in thermal boost mode, and a method to accumulate and retain product water.

15 Claims, 16 Drawing Sheets

FOUR-FLUID BIPOLAR PLATE FOR FUEL CELL

CROSS-REFERENCE TO RELATED APPLICATIONS

This application is a continuation of U.S. patent application Ser. No. 17/344,377, filed Jun. 10, 2021, which application is incorporated herein in its entirety by reference.

BACKGROUND OF THE INVENTION

This disclosure relates generally to fuel cell bipolar plates and, more specifically, to a bipolar plate structure that provides improved delivery of humidified reactants and better removal of product water.

In a proton exchange membrane (PEM) fuel cell, hydrogen fuel is supplied to a negative electrode (anode) where it catalytically dissociates into protons and electrons according to the oxidation reaction $H_2 \rightarrow 2H^+ + 2e^-$. The protons ($H^+$) pass through a membrane electrolyte to a positive electrode (cathode) while the electrons ($e^-$) are conducted through an external path creating an electric current between the anode and cathode through an external load. At the cathode the protons and electrons recombine in the presence of oxygen to form water according to the reduction reaction: $O_2 + 4e^- + 4H^+ \rightarrow 2H_2O$. The by-products of the PEM fuel cell reaction are water and heat; the heat requiring that the fuel cell be cooled to maintain an acceptable internal temperature.

A single fuel cell includes a membrane electrode assembly (MEA), comprising the membrane electrolyte interposed between a pair of electrodes (anode and cathode), and, adjacent each electrode opposite the membrane electrolyte, an electrically conductive plate that defines the reactant gas flow fields. Typical flow field plates direct the reactant gases through a gas diffusion layer and a microporous layer to their respective electrodes. In some designs, the flow field plate can also transport the water byproduct away from the cell.

A plurality of fuel cells are typically arranged and connected consecutively in a stack to increase the electrical output of the electrochemical conversion assembly or fuel cell. In this arrangement, two adjacent cell units can share a common polar plate, which serves as the anode and the cathode for the two adjacent cell units it connects in series. Such a polar plate is commonly referred to as a "bipolar plate".

SUMMARY OF THE INVENTION

In one embodiment, a bipolar plate for a fuel cell includes a nonporous sub-plate and a porous sub-plate. The nonporous sub-plate includes a water management side, an opposing reactant side, and an internal coolant passage therebetween. The porous sub-plate includes a reactant side and an opposing water management side. The reactant side includes a first reactant flow field, and the water management side is fluidly connected to the water management side of the nonporous sub-plate.

In one example, the water management side of the porous sub-plate includes a bubble barrier pore structure adapted to permit liquid transport through the pore structure and prevent reactant gas transport through the pore structure.

In another example, the water management side of the nonporous sub-plate includes a recessed perimeter adapted to provide a nested seal with the porous sub-plate.

In another embodiment, a method is provided to operate a four-fluid fuel cell in thermal boost mode. The method includes a step of providing a fuel cell having an oxidant flow field, a fuel reactant flow field, a water management flow field, and an independent circulating coolant loop operable to remove sensible heat. The coolant loop is in fluid communication with a coolant flow field. The method further includes the steps of decreasing a flow rate of coolant in the coolant loop to lower the sensible cooling capacity, and allowing the fuel cell to maintain or increase in temperature so as to increase evaporative cooling.

In one example, the method further includes a step of increasing a flow of water through the water management flow field to compensate for the increased evaporation.

In yet another embodiment, a method is provided to operate a four-fluid fuel cell so as to accumulate and retain product water. The method includes a step of providing a fuel cell having an oxidant flow field, a fuel reactant flow field, a water management flow field, and an independent circulating coolant loop operable to remove sensible heat. The coolant loop is in fluid communication with a coolant flow field. The method further includes the steps of increasing a flow of coolant in the coolant loop to increase sensible cooling, and allowing the fuel cell to maintain or decrease in temperature so as to reduce evaporative cooling.

In one example, the method further includes a step of decreasing a flow of water through the water management flow field to compensate for the decreased evaporation.

BRIEF DESCRIPTION OF DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
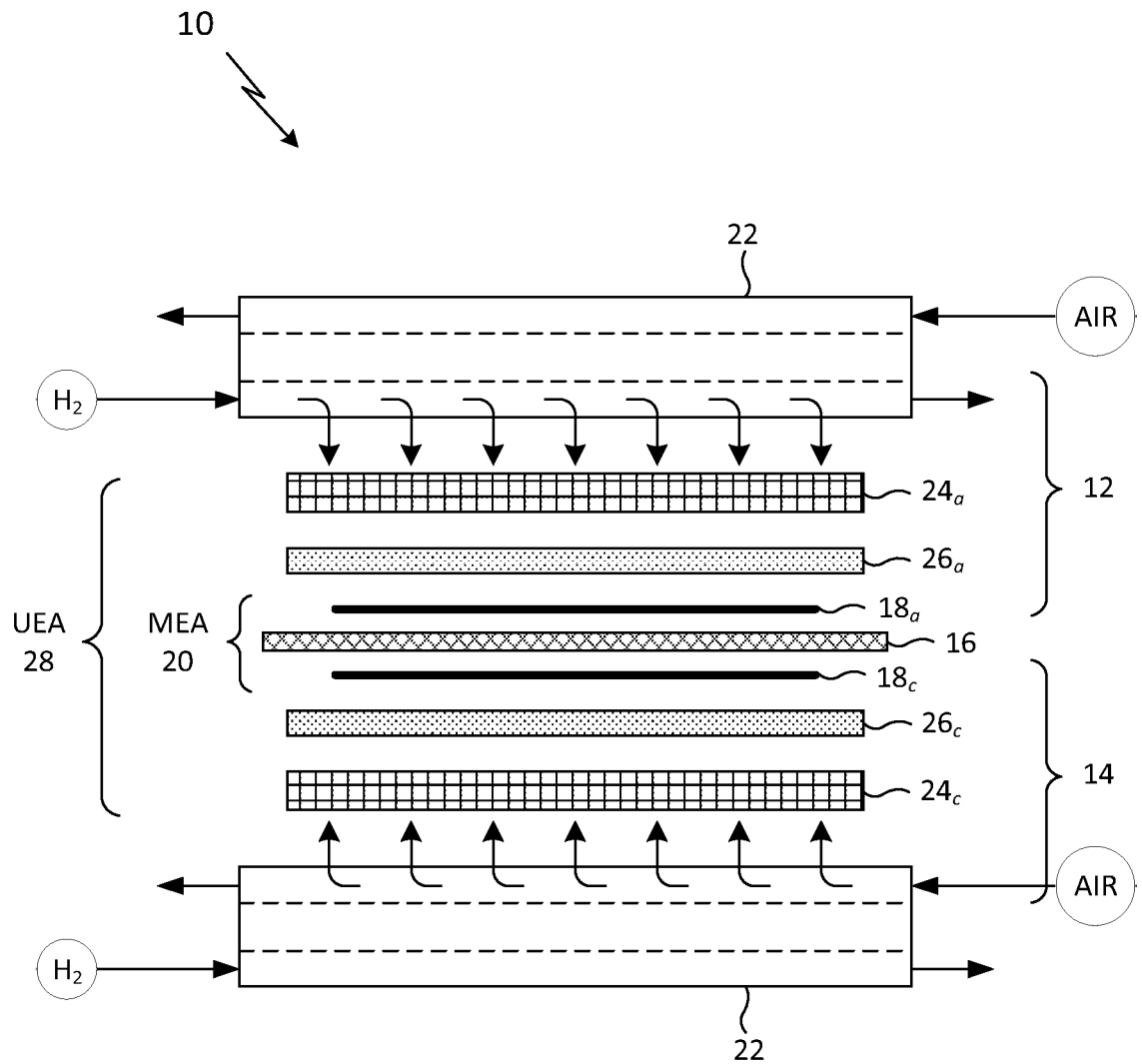
FIG. 1 depicts an schematic cross sectional exploded view of a typical fuel cell.

FIG. 1 illustrates a typical polymer electrolyte membrane (PEM) fuel cell 10 which, in general, comprises a negative electrode (anode) 12 and a positive electrode (cathode) 14 separated by an ionomer membrane 16. An anode catalyst layer $18_a$ and a cathode catalyst layer $18_c$ are formed on respective sides of the generally planar membrane to convert hydrogen and oxygen reactant gases into electricity and water. This assembly is typically referred to as a membrane electrode assembly (MEA) 20. The catalyst layers $18_a$, $18_c$ may be the same for the anode 12 and the cathode 14, but typically they are different. For example, the anode catalyst layer $18_a$ may function to split hydrogen atoms into hydrogen ions and electrons, while the cathode catalyst layer $18_c$ may function to react oxygen gas and electrons to form water.

Reactants (i.e., hydrogen and air) are directed to the MEA 20 by a flow field plate 22 that typically includes reactant flow channels (indicated by dashed lines). Flow field plate 22 is shown as a bipolar plate, which includes reactant flow channels for both the fuel and oxidant. The reactants pass from the channels through a gas diffusion layer (GDL) $24_a$, $24_c$ abutting the flow field plate 22, and then through a microporous layer (MPL) $26_a$, $26_c$ that is positioned between the GDL and the respective catalyst layer $18_a$, $18_c$. The GDL may have several functions, including diffusion of reactant gas streams to the catalyst layer, transporting liquid and vapor water by-products away from the catalyst layer to a cathode gas channel, where it is carried away by the gas streams, collecting the current generated from the electrochemical reactions, and providing mechanical strength to support and protect the catalyst-coated membrane. The GDL is typically a highly porous (e.g., 60%-90%) non-woven carbon fiber paper or woven carbon fiber cloth, approximately 0.25-0.35 mm thick, with pore sizes on the order of hundreds of microns, and may be treated with a variety of proprietary substances to improve performance. The MPL functions to minimize the contact resistance between the GDL and the catalyst layer, and help to improve water transport. The MPL typically consists of a thin layer of carbon powder and PTFE particles coated to the GDL, with pore sizes on the order of one micron. Some fuel cells are fabricated to produce the membrane electrode assembly (MEA), the microporous layers (MPLs), and the gas diffusion layers (GDLs) as a one-piece assembly, known as a unitized electrode assembly (UEA) 28.

Figure 2:
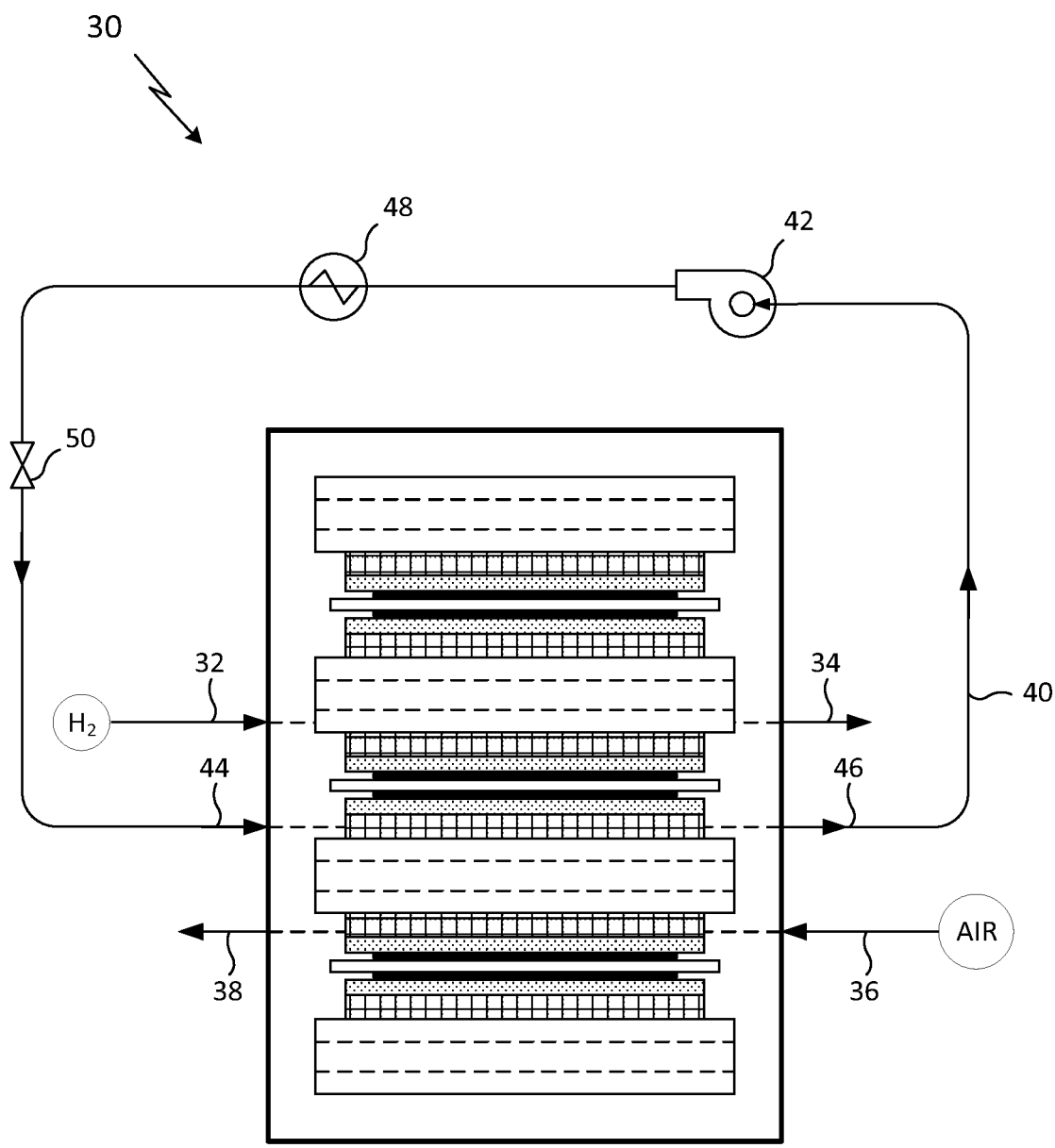
FIG. 2 depicts a schematic section view of a typical fuel cell power plant.

FIG. 2 illustrates a generic fuel cell power plant 30, using a stack of fuels cells 10 as described in FIG. 1. A fuel such as hydrogen ($H_2$) is provided to a fuel inlet 32 and flows through the anode flow field plates to be distributed to the anode catalyst layers. Unconsumed fuel flows out a fuel exit 34, and may flow through a recycle pump (not shown) back to the fuel inlet 32, and may be periodically purged to ambient. An oxidant such as air is provided by a blower (not shown) to an air inlet 36 and flows through the cathode flow field plates to be distributed to the cathode catalyst layers. Excess process air, having been humidified by the water by-products, flows out an air exit 38 and may pass through a radiator and/or condenser (not shown) before being exhausted to the environment.

The power plant 30 may further include a coolant loop 40 for removing heat from the fuel cells. In many automotive applications, the coolant is a mix of water and ethylene glycol to prevent the coolant from freezing in cold climates. A pump 42 provides coolant into a coolant inlet 44 where it is then directed through cooler plates or the like (not shown, but typically positioned between the fuel cells 10) and distributed over the surface of the plate. The fuel cells 10 convey sensible heat to the circulating coolant, so the coolant becomes warmer but does not undergo phase change. Upon leaving the stack at a coolant exit 46, the coolant passes through a heat exchange apparatus 48 whereupon sensible heat is rejected prior to circulating back to the inlet 44. In one example, the heat exchange apparatus 48 is a radiator. A flow control valve or orifice 50 may be used to regulate the coolant flow.

As noted in FIG. 1, the reactant flow field plates 20 are bipolar plates. Most bipolar plate designs utilize solid material, and a very small percentage of the designs utilize porous material on both the anode and cathode side. Each design has its own advantages and disadvantages. Solid bipolar plates, as the name implies, are impermeable to the hydrogen fuel and are therefore excellent at keeping the reactant gases separated. Furthermore, sealing solid bipolar plates in a stack is relatively straightforward, due to their impermeability. Thus, the power plant stack can be pressurized, which improves cell performance and lowers cell decay. Another advantage of solid bipolar plates is that their impermeable nature permits use of an antifreeze-type coolant in the stack, such as a water/ethylene glycol mix (WEG). This antifreeze-type coolant is extremely beneficial in fuel cells operating in cold environments, such as automotive applications. However, WEG will poison the membrane electrodes, so care must be taken to isolate the WEG from the MEA.

Solid bipolar plates may be fabricated from metal, such as stainless steel or titanium. Metal plates can be cheap to mass-produce because the flow field geometry can be formed by conventional high-volume manufacturing methods, such as stamping or the like. Solid bipolar plates may also be fabricated from nonporous carbon, or from a polymeric (composite) material. Solid carbon or composite plates can be mass-produced by molding or the like, and the dimensional tolerances can usually be held tighter than metal-formed plates. However, solid carbon or composite plates are more expensive to produce than metallic plates.

Although solid bipolar plates can be useful and may be advantageous for certain applications, they suffer from drawbacks. One drawback to metallic plates is that they are prone to corrosion, due to the presence of air and water at very high electrochemical potential. The corrosion layer is nonconductive, and as the plate continues to corrode the fuel cell loses performance. Coatings have been developed and applied to the plates to mitigate corrosion, but even this technique has operational limits.

In particular, the automotive industry might target fuel cell operational life at 5,000 hours. Some coatings on metal plates are said to have achieved this goal. However, the heavy-duty vehicle industry may require an operational life of 30,000 hours. No current automotive coatings or constructions are anywhere near that limit. Thus, there is a need in the heavy-duty vehicle industry to develop fuel cells with much longer operational limits, possibly as high as 30,000 hours.

Another drawback to solid plates is they have no inherent water management capability. In the operation of PEM fuel cells, it is critical that a proper water balance be maintained between a rate at which water is produced at the cathode electrode, including water resulting from proton drag through the PEM electrolyte, and rates at which water is removed from the cathode or supplied to the anode electrode. For PEM fuel cells, if insufficient water is returned to the anode electrode, adjacent portions of the PEM electrolyte dry out, thereby decreasing the rate at which hydrogen ions may be transferred through the PEM and also resulting in cross-over of the reducing fluid leading to local overheating. Similarly, if insufficient water is removed from the cathode, the cathode electrode may become flooded effectively limiting oxidant supply to the cathode and hence decreasing current flow. Additionally, if too much water is removed from the cathode, the PEM may dry out, limiting ability of hydrogen ions to pass through the PEM thus decreasing cell performance. Solid plates typically require external means of water management, such as external humidifiers to prevent the MEA from drying out and cracking.

Porous bipolar plates, sometimes referred to as water transport plates, are porous separator plates used on both the cathode and anode side of an electrode in a fuel cell. Porous bipolar plates tightly control pore size to create a bubble barrier that, during fuel cell operation, permits liquid transport through the pores into a liquid water cavity, but prevents reactant gas transport. Liquid transport permits membrane hydration and enables removal of product water on the cathode side resulting from the electrochemical reaction within the fuel cell. Preventing reactant gas transport inhibits the fuel and oxidant gases from escaping into the liquid water cavity.

The porous plates provide excellent moisture balance to keep the membrane electrode assembly hydrated by wicking up excess water in flow field channels and migrating it to those areas that are losing water through evaporation. The porous bipolar plates are exposed to water flow fields to maintain desired operation of the fuel cell. In local regions of the cell in which the reactant gas is flowing from a region of low temperature to higher temperature, water evaporates off the porous plate to saturate the gas stream with water vapor; in regions where the reactant gas is moving from higher temperature to lower temperature, product water that is formed in the electrochemical reaction and liquid water that condenses out of the cooling gas stream can be wicked away by the porous plate. As a result, one advantage of fuel cell systems with porous bipolar plates is that they have exhibited very high durability. Another advantage is that systems with porous bipolar plates do not require the use of external humidifiers, which can reduce weight and complexity.

Typically, a pump-driven circulating water loop may be utilized to provide the cell cooling function as well as the driving force to move the water through the pores of the water transport plate to remove product water.

Although porous bipolar plates have advantages, they suffer from drawbacks. For example, they can be expensive to mass-produce, due to the difficulty in manufacturing plates with specific pore sizes. Another drawback is that the porous plates are difficult to seal, which can lead to reliability problems in a pressurized system. Another significant drawback is that fuel cell systems utilizing porous bipolar plates cannot use antifreeze-type coolants such as WEG in the water cooling loop because the coolant will absorb into the pores of the plate and poison the MEA.

Embodiments of the disclosed invention resolve many of the aforementioned problems with bipolar plates by utilizing a four-fluid plate construction that provides a fuel reactant flow field, an oxidant flow field, a water management flow field, and a dedicated coolant passage for antifreeze-type coolant. Embodiments include both a nonporous plate portion and a porous plate portion, judiciously chosen to capture the best aspects of both designs while reducing or eliminating the associated drawbacks. The four-fluid bipolar plate can be easily fabricated to reduce cost.

Figure 3:
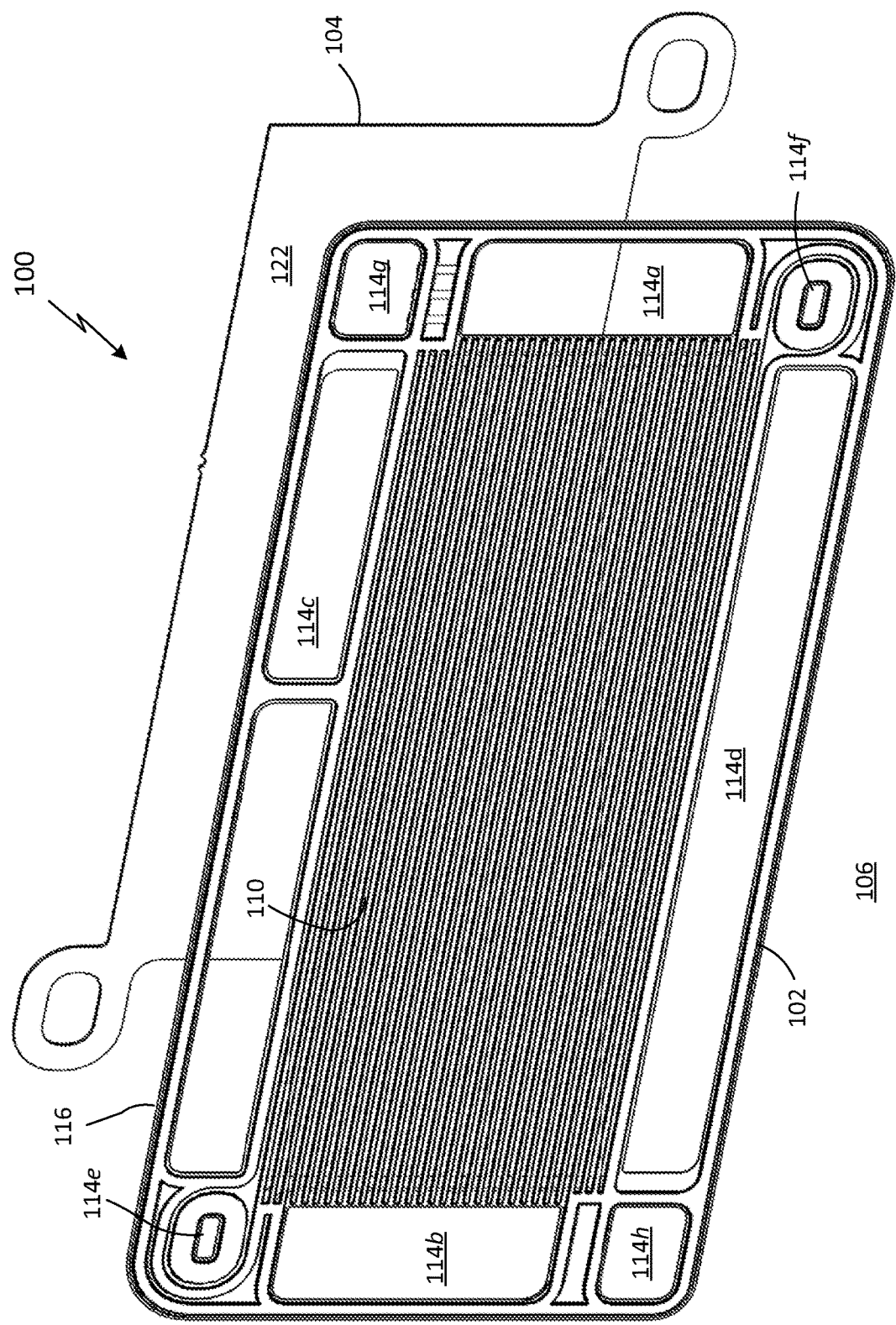
FIG. 3 depicts an exploded perspective anode-side view of a bipolar plate in accordance with one embodiment of the present invention.
Figure 4:
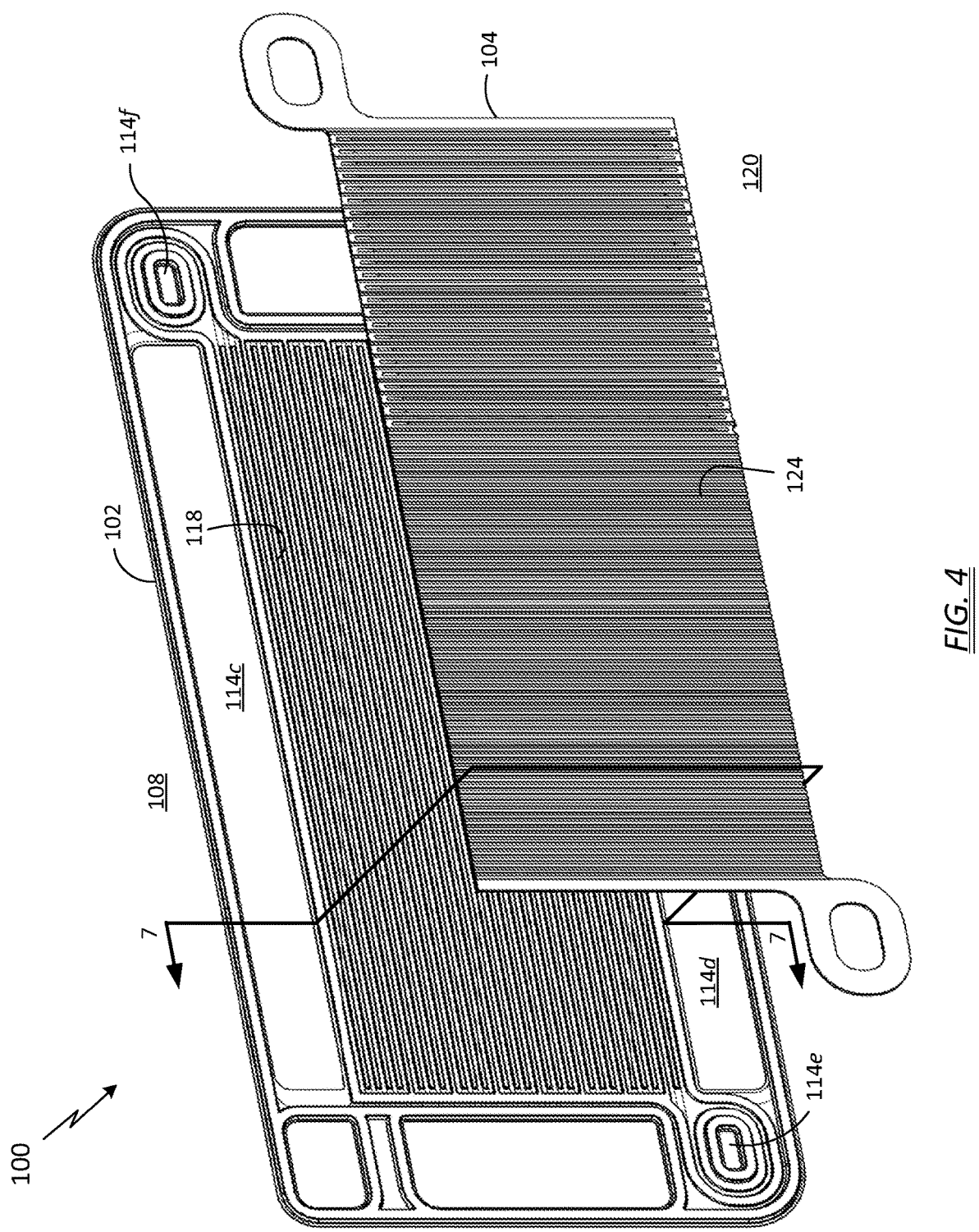
FIG. 4 depicts an exploded perspective cathode-side view of the bipolar plate shown in FIG. 3.

Referring to FIGS. 3 and 4, a bipolar plate 100 for a fuel cell includes a nonporous sub-plate 102 and a porous sub-plate 104. In one embodiment of the present invention, the nonporous sub-plate 102 includes a reactant side 106 (shown in FIG. 3) and an opposing water management side 108 (shown in FIG. 4). As shown, the reactant side 106 supplies hydrogen to the anode side of the MEA via a fuel flow field. Non-limiting examples of the flow field include a cavity, a porous substrate, or, as shown in the illustrated embodiment, fuel flow field channels 110. The nonporous sub-plate 102 further includes an internal coolant passage 112 (FIGS. 8 and 11) that isolate an antifreeze-type coolant, such as WEG, from other components in the fuel cell. Other general features of the nonporous sub-plate 102 may include internal manifolds 114 for fuel supply 114$a$ and return 114$b$, oxidant supply 114$c$ and return 114$d$, water management supply 114$e$ and return 114$f$, and WEG coolant supply 114$g$ and return 114$h$. Sealing provisions 116 allow a plurality of fuel cells to be sealed and operated at pressure.

FIG. 4 shows the opposing side of the bipolar plate 100. The water management side 108 of the nonporous sub-plate 102 includes a water flow field. Non-limiting examples of the flow field include a cavity, a porous substrate, or, as shown in the illustrated embodiment, water channels 118 that form a portion of an external circulating water management loop 150 (FIG. 13) that allows proper water management of the cathode flow field, discussed in detail below. Water enters the plate channels through water management supply manifold 114$e$ and exits through water management return manifold 114$f$.

The porous sub-plate 104 includes a reactant side 120 and an opposing water management side 122. The reactant side 120 supplies oxidant (e.g., air) to the cathode side of the MEA via an oxidant flow field. Non-limiting examples of the flow field include a cavity, a porous substrate, or, as shown in the illustrated embodiment, oxidant flow field channels 124. The water management side 122 (FIG. 3) is featureless (e.g., flat) in this embodiment, but plays a vital role in maintaining optimal cell performance and durability.

The porous sub-plate 104 may be fabricated from graphite or other carbon-based materials, and may also be fabricated from a metal, such as titanium or stainless steel. Features such as the channels may formed by hydroforming, casting, thermal forming, 3D printing/additive manufacturing, or milling/machining.

As noted earlier, the pores in porous sub-plate 104 are sized to create a bubble barrier during fuel cell operation. The pore size is determined by the specific fuel cell operating conditions and pressures. For graphite or other carbon-based materials, the pores may be formed into the plate by known processes. For example, U.S. Pat. No. 6,197,442 details a manufacturing process in which graphite powder, reinforcing fibers, cellulosic fibers, and a thermosetting resin are mixed with a liquid to form a slurry and showered onto a screen to form a planar sheet which is dried to form paper. The paper is cut into the desired size and is laid-up. The lay-up is laminated with pressure and heat, carbonized, and graphitized to form a water transport plate for later machining as desired. The finished porous plate exhibits excellent physical characteristics for bubble pressure, water permeability, median pore size, porosity, thru-plane resistivity and compressive yield strength. For metal porous plates, the pores may be formed by punch press or laser drilling, for example.

Figure 5:
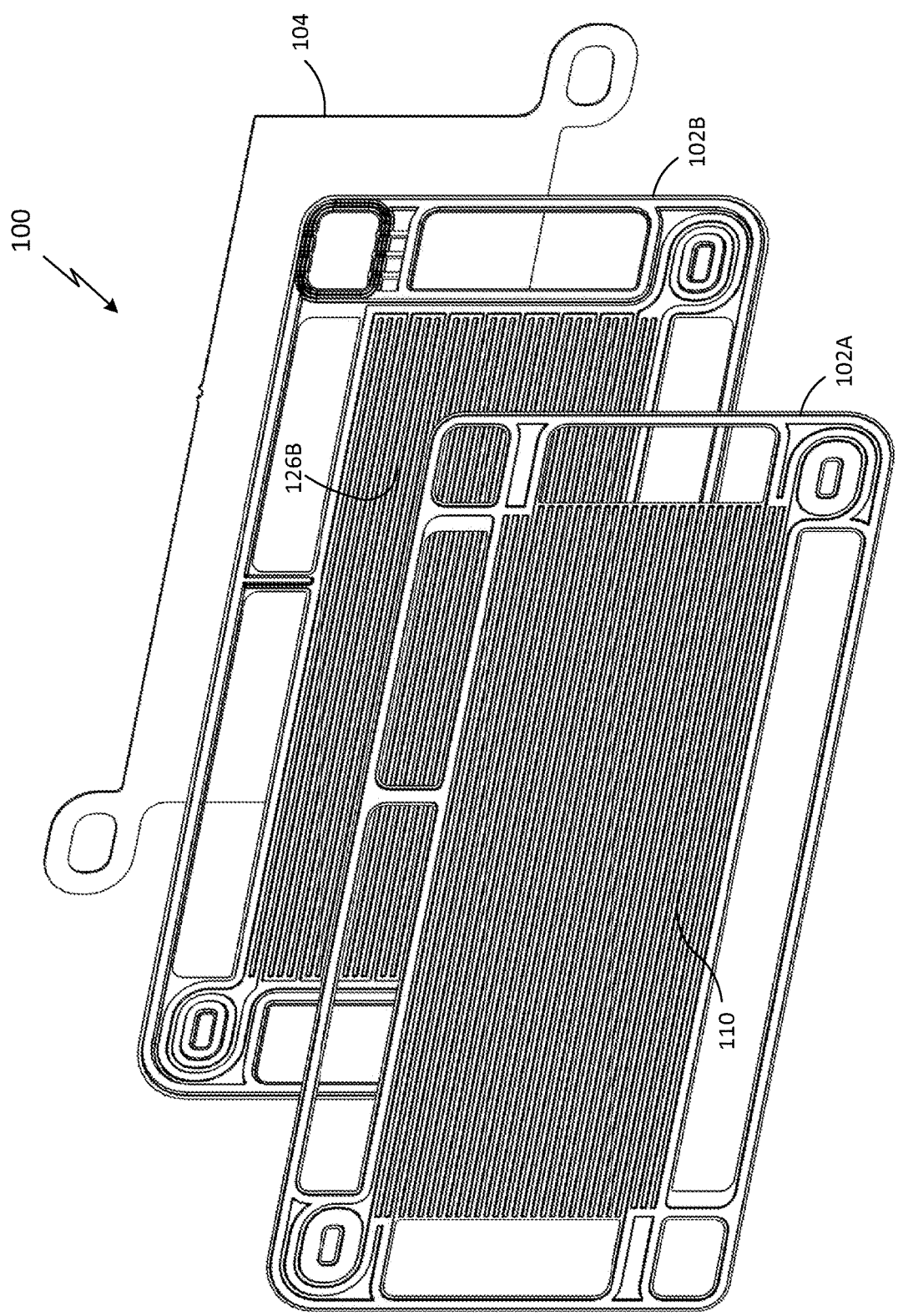
FIG. 5 depicts a further exploded view of the bipolar plate shown in FIG. 3.
Figure 6:
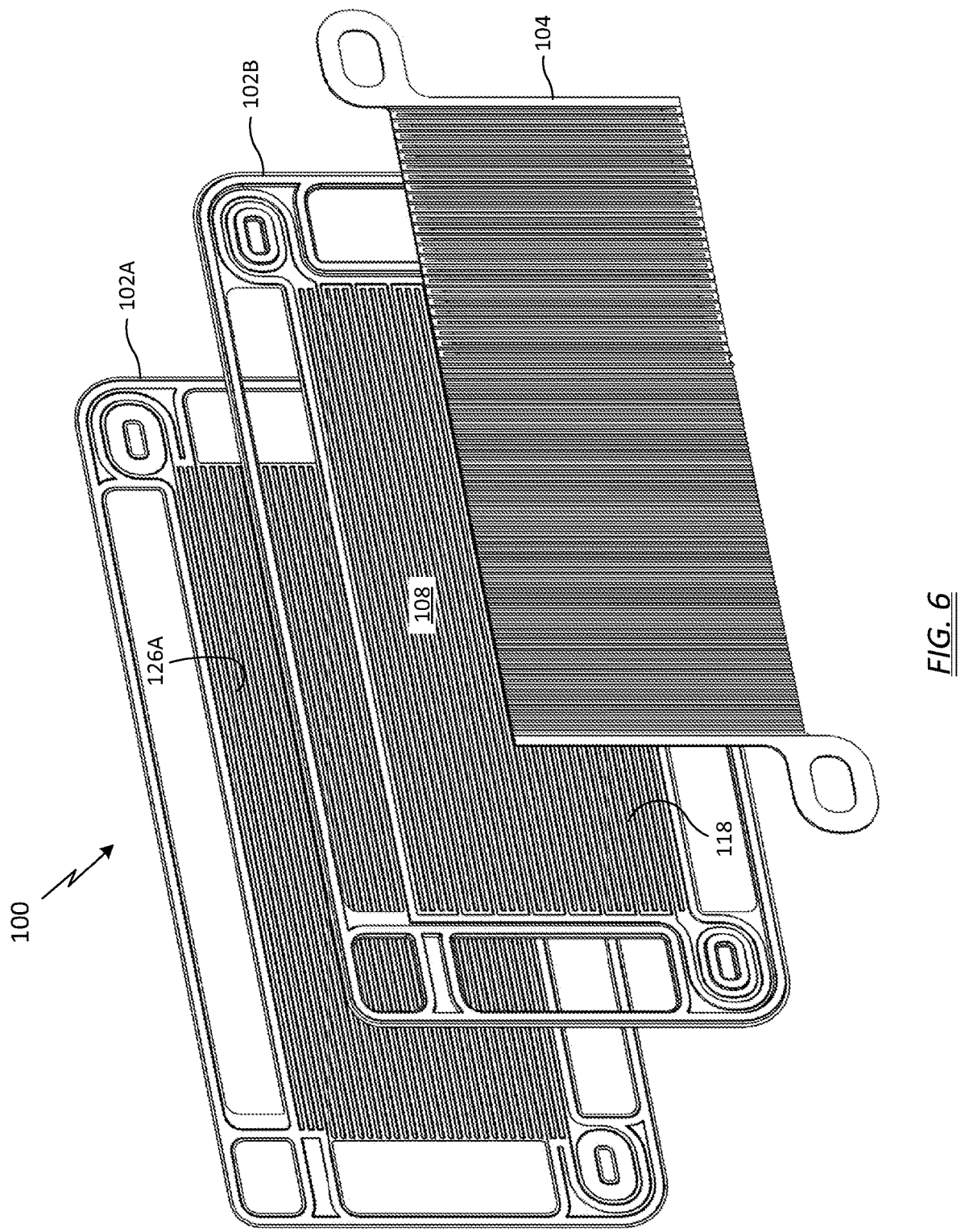
FIG. 6 depicts a further exploded view of the bipolar plate shown in FIG. 4.

FIGS. 5 and 6 depict a further exploded view of the nonporous sub-plate 102, according to a first embodiment of the invention. The nonporous sub-plate 102 may be formed of two half-plates 102A and 102B that are easily manufactured then joined together. For example, the half-plates may be fabricated from metal such as stainless steel or titanium, the flow channels and other features may be formed by metal stamping the like, and the two half-plates joined together by welding. Other non-limiting examples of joining methods include laser welding, brazing, thermoplastic bonding, or adhesives, for example. Half-plate 102A in the illustrated embodiment includes fuel flow field channels 110 on the reactant-facing side (FIG. 5), and WEG coolant half-channels 126A on the opposing side (FIG. 6). Half-plate 102B includes water channels 118 on the water management side 108 (FIG. 6), and WEG coolant half-channels 126B on the opposing side (FIG. 5).

Figure 7:
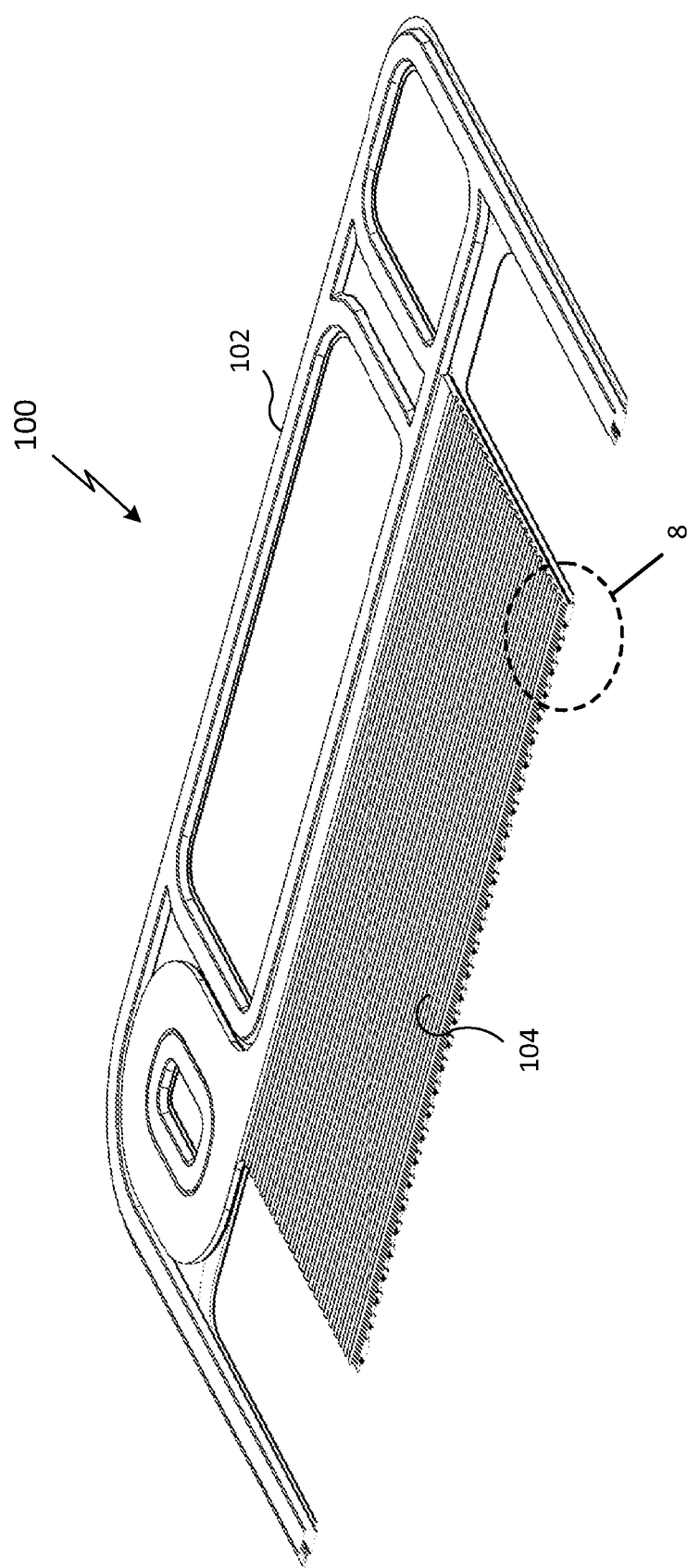
FIG. 7 depicts a perspective cathode-side section view of the bipolar plate shown in FIG. 3.
Figure 8:
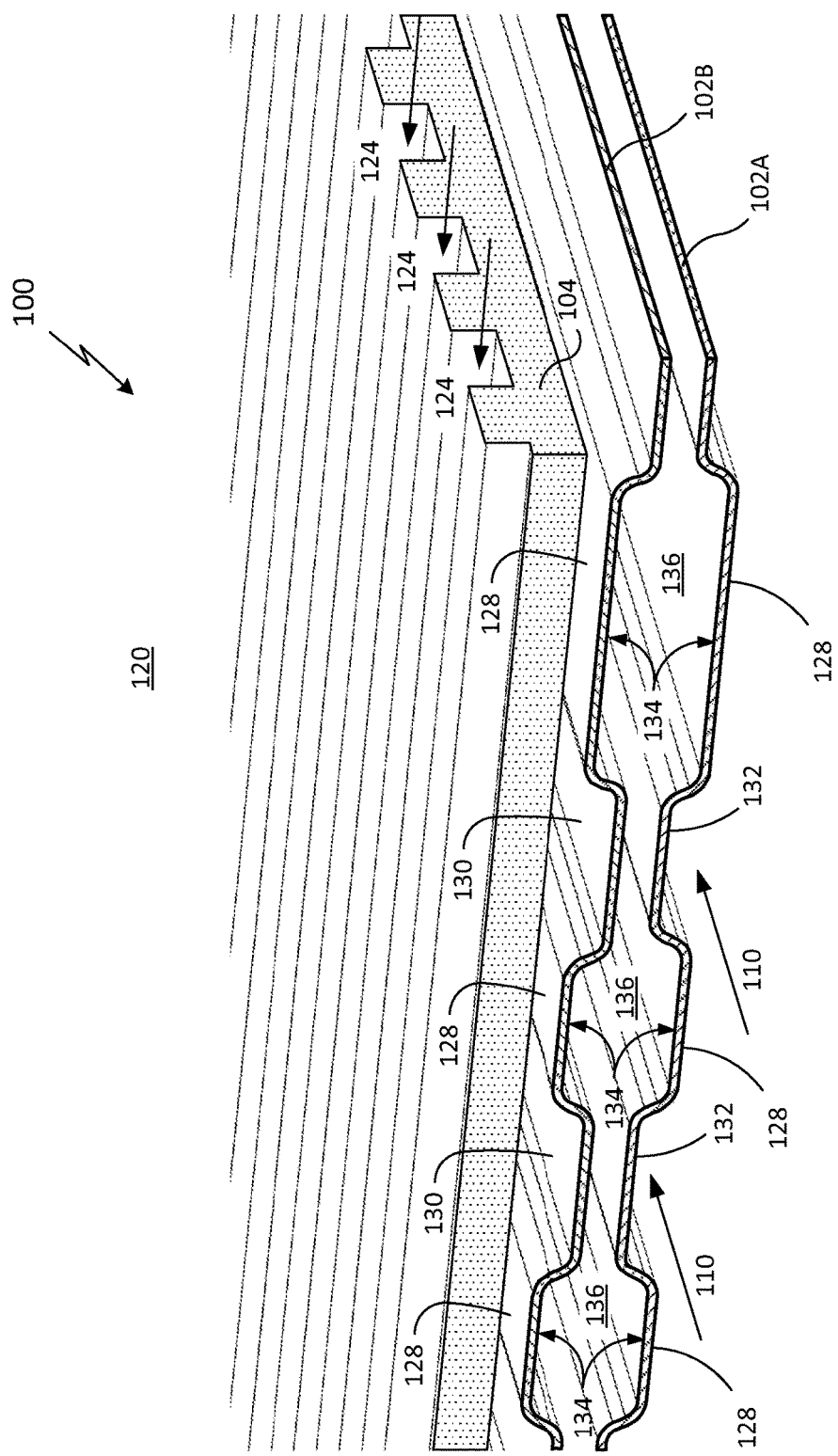
FIG. 8 depicts an enlarged section view of the bipolar plate shown in FIG. 7.

Greater detail can be found with reference to FIGS. 7 and 8, wherein FIG. 7 depicts a cathode-side section view of the bipolar plate 100, taken approximately where indicated in FIG. 4, and FIG. 8 depicts an enlarged view of the plate shown in FIG. 7. Referring to FIG. 8, the nonporous sub-plate 102 and the porous sub-plate 104 are shown in greater detail. Half-plates 102A, 102B are shown separated for clarity (e.g., before joining). Each half-plate may include rows of raised surfaces 128, and the valleys 130, 132 between them may define fluid flow channels on the external surface of the nonporous plate. The raised surfaces 128 on one side of the plate define depressions 134 on the opposing side of the same plate. The depressions may define an internal cavity 136 when the two half-plates 102A, 102B are joined together. In one example, the valleys 130 on half-plate 102B define the water management channels 118, the valleys 132 on half-plate 102A define the fuel flow field channels 110, and the internal cavity 136 defines the internal antifreeze coolant passages 112.

The reactant side 120 of the porous sub-plate 104 includes oxidant flow field channels 124 to supply air to the MEA. In one example, the channels 124 are transverse to the fuel flow field channels 110. The water management side 122 of the porous sub-plate 104 is positioned against the flat raised surfaces 128 of half-plate 102B. In this manner, when demineralized (DI) water is circulated through the water channels 118, the pores within the porous sub-plate 104 is in fluid communication with the DI water, allowing the sub-plate 104 to become and remain fully saturated with liquid.

The desired porosity in the porous sub-plate 104 may be achieved by any suitable method know in the fuel cell arts. For example, the porous sub-plate 104 may be constructed as a water transport plate (WTP), net shape molded from a slurry having appropriate particle size, or laser drilled to achieve desired pore size.

Figure 9:
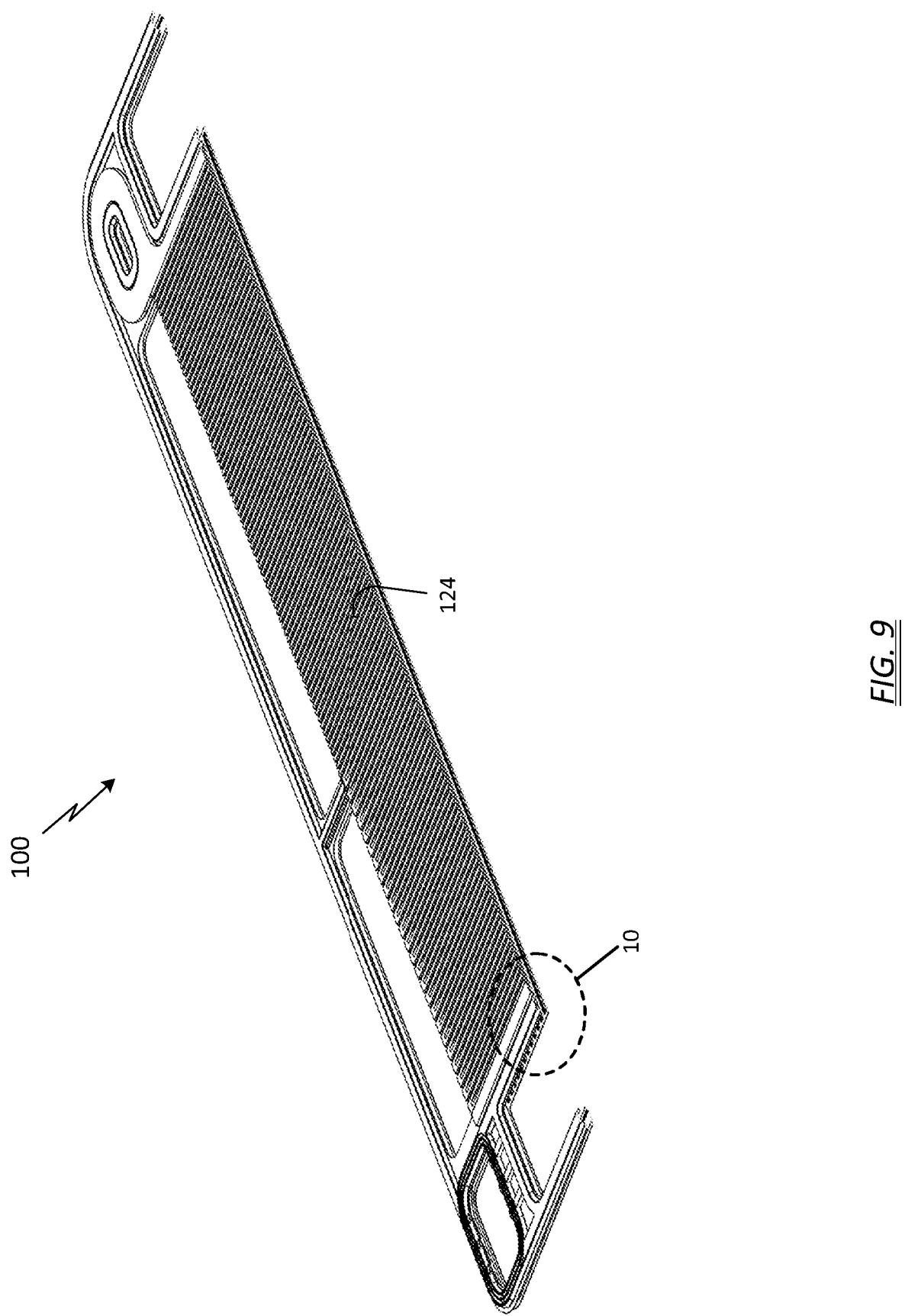
FIG. 9 depicts another perspective cathode-side section view of the bipolar plate shown in FIG. 3.
Figure 10:
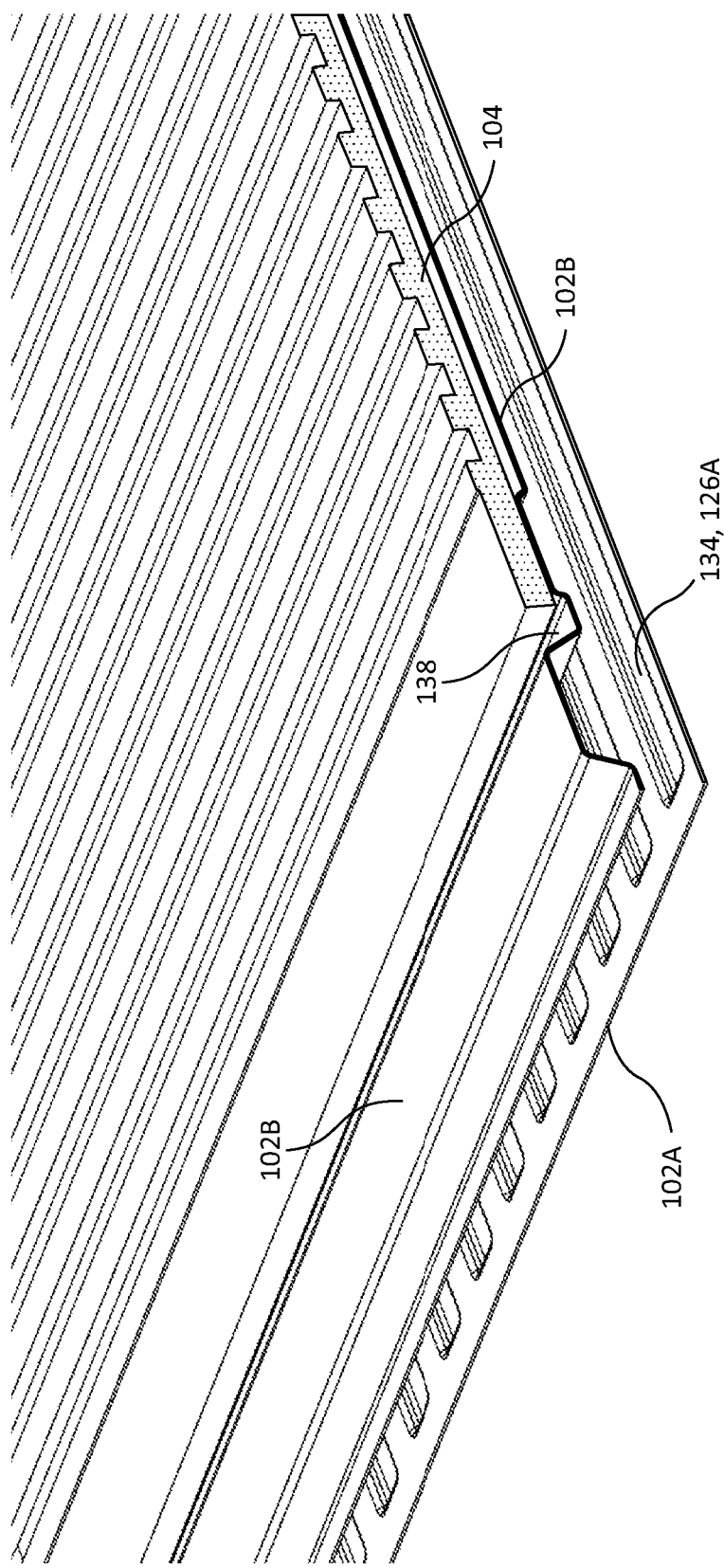
FIG. 10 depicts an enlarged section view of the bipolar plate shown in FIG. 9.

FIG. 9 depicts an alternate section view of the bipolar plate 100; a portion of the view is enlarged in FIG. 10 to illustrate one possible construction. Turning to FIG. 10, the section view includes half-plate 102A, half-plate 102B, and porous sub-plate 104. Similar to FIG. 8, half-plates 102A and 102B are shown somewhat separated for clarity. Also shown are the depressions 134 in half-plate 102A that form the WEG coolant half-channels 126A.

The porous sub-plate 104 may be sealed to the nonporous sub-plate 102 by conventional means to prevent gas or water leakage. For example, sealing provision 116 may include adhesives, nesting, interference fit, or a groove to accept a molded compressive seal, gasket, or O-ring. In one example, the porous sub-plate 104 may be nested into a recess 138 formed into the water management side 108 of the nonporous sub-plate 102. The recess 138 spans the entire planform of the porous sub-plate 104 to effectively capture the plate and assure proper alignment during assembly. In some examples, the recess 138 can reduce the overall thickness of the bipolar plate 100 because porous sub-plate 104 is substantially recessed into the thickness of the other plate and only minimally adds to the overall thickness dimension.

Figure 11:
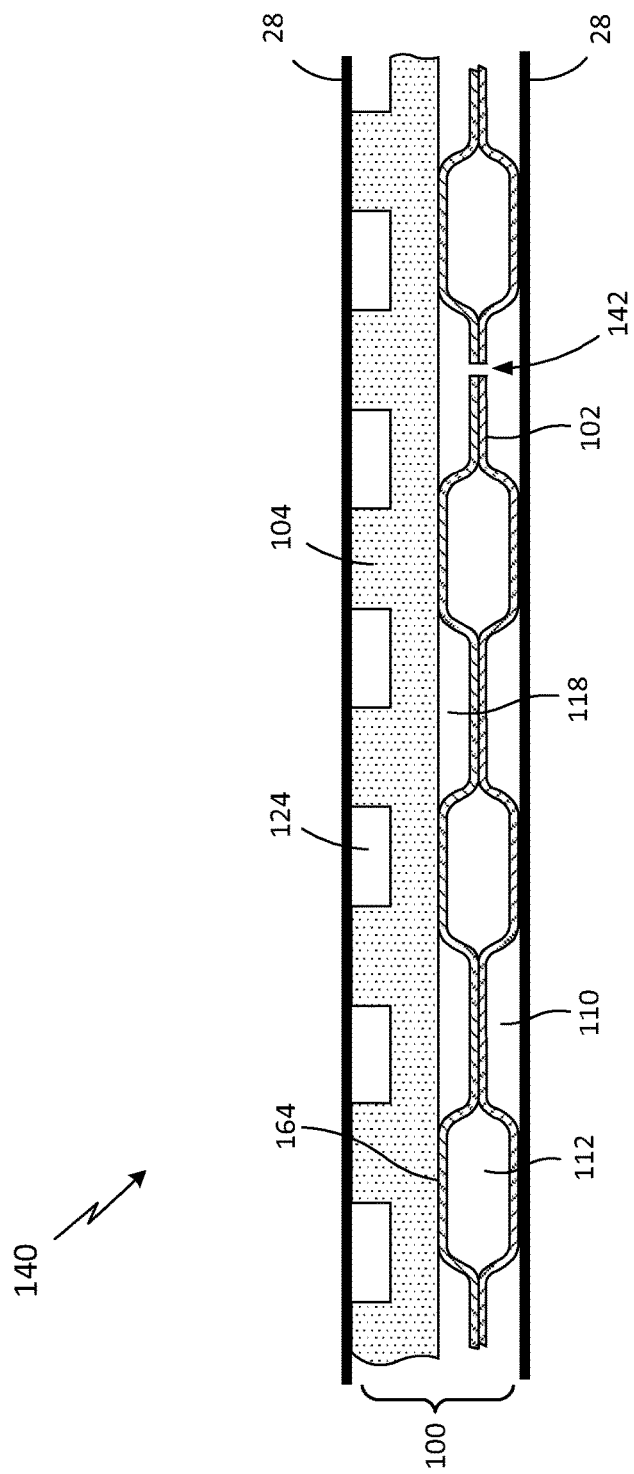
FIG. 11 depicts a section view of a fuel cell with a bipolar plate according to a first embodiment of the invention.
Figure 12:
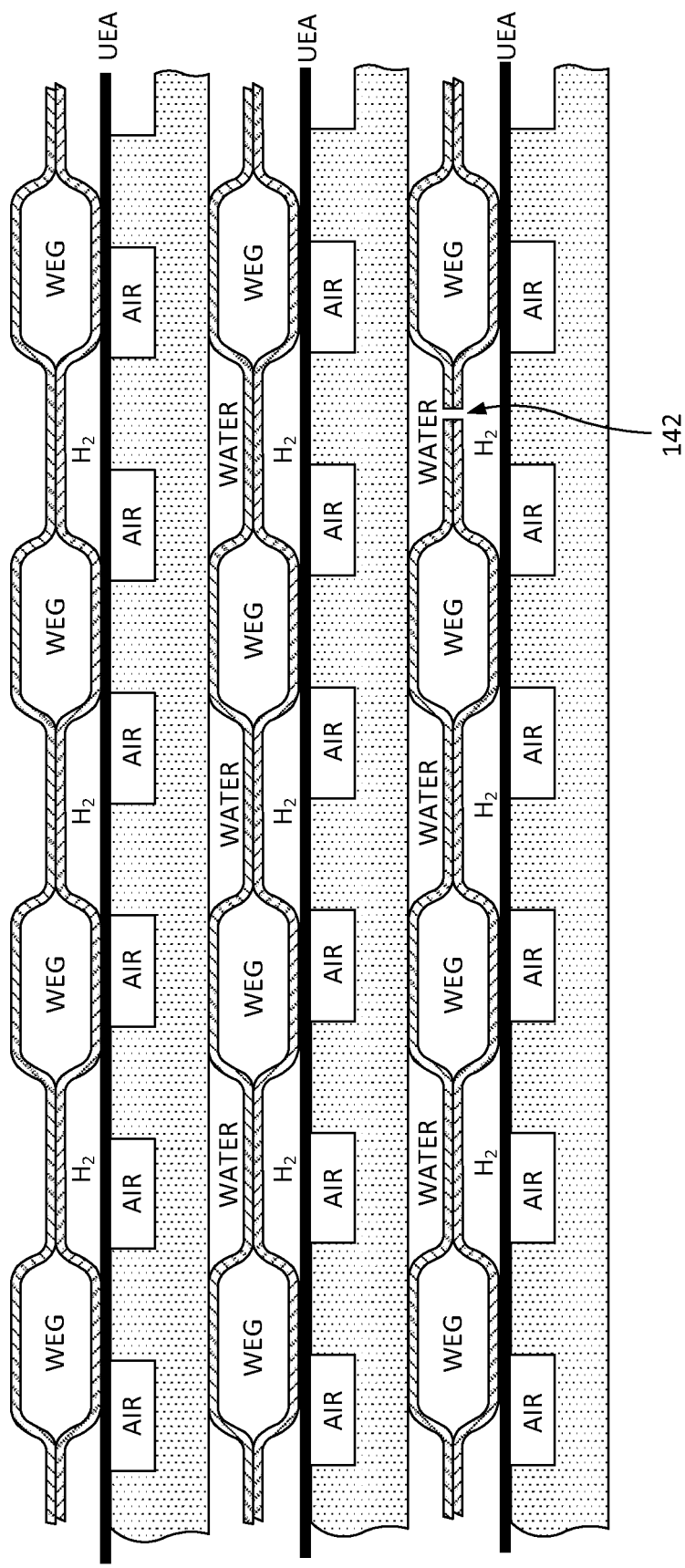
FIG. 12 depicts a section view of a stack of fuel cells with the bipolar plate according to the first embodiment of the invention.
Figure 13:
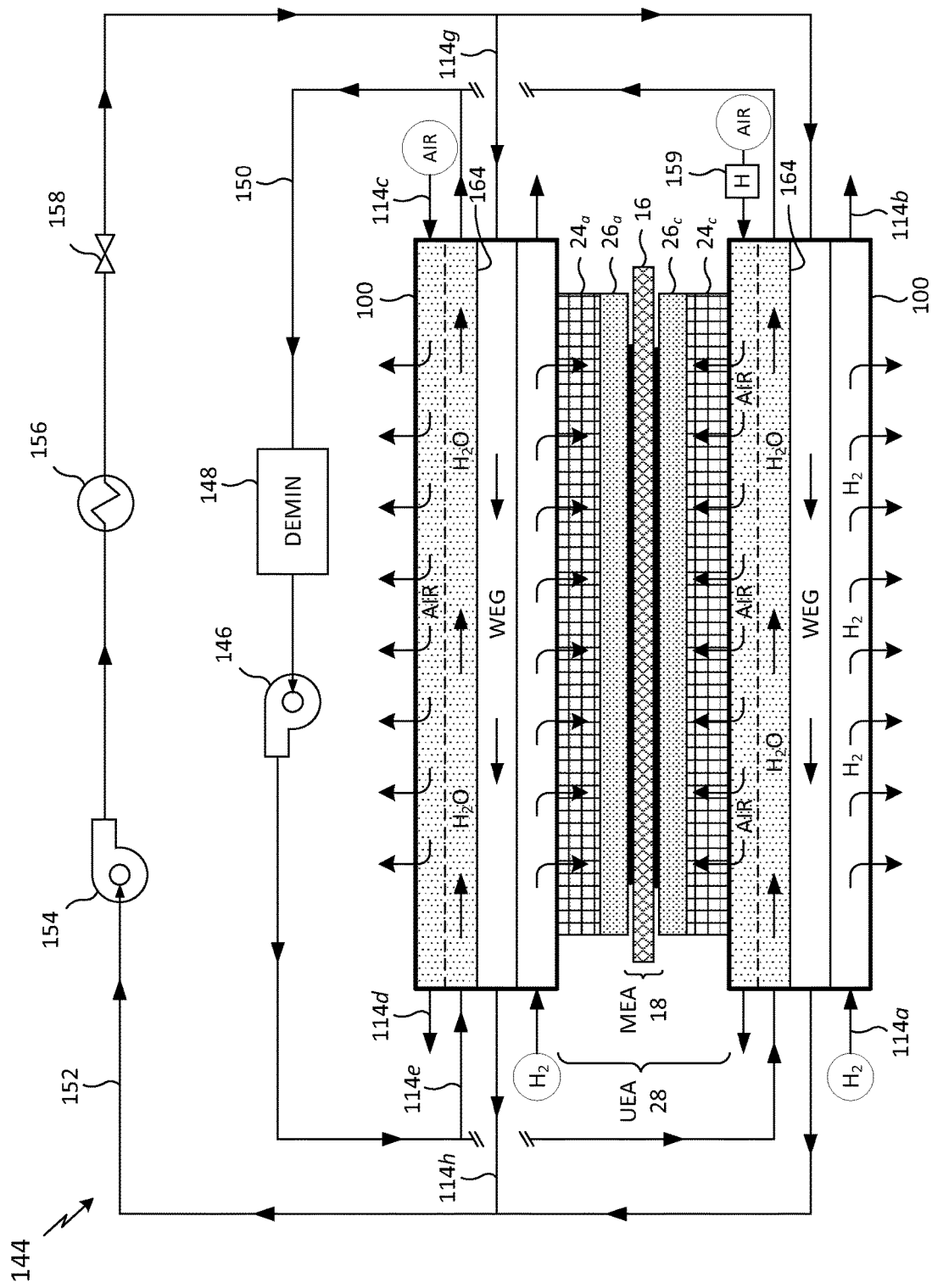
FIG. 13 depicts a schematic section view of a fuel cell power plant according to one embodiment of the invention.

FIG. 11 depicts a section view of a proton exchange membrane (PEM) fuel cell 140 with a bipolar plate 100 according to a first embodiment of the invention, FIG. 12 depicts a stack of such fuel cells, and FIG. 13 depicts a section of a fuel cell power plant 144 with the disclosed bipolar plate 100. In the illustrated example, the oxidant flow field channels 124 are shown as parallel to the fuel flow field channels 110, but this is for illustration purposes and the convention will be followed for other embodiments. The fuel cell 140 includes bipolar plate 100 between an upper and lower unitized electrode assembly 28 (UEA). The bipolar plate 100 abuts against each UEA 28.

In operation, hydrogen is introduced at inlet 114a and reaches the anode-side of the UEA 28 by flowing through the fuel flow field channels 110 in the nonporous sub-plate 102. Air is introduced at inlet 114c and reaches the cathode-side of the UEA 28 by flowing through the oxidant flow field channels 124 in the porous sub-plate 104. A water pump 146 circulates water through demineralizer 148 in water management loop 150. Demineralized water, or deionized (DI) water, flows into stack 144 through water management supply 114e and through the channels 118 formed by the nonporous sub-plate 102 and the porous sub-plate 104. The pores in porous sub-plate 104 fill with water and the sub-plate acts as a sponge, holding water to keep the UEA 28 hydrated. The porous sub-plate 104 can either transmit the liquid directly to the UEA 28 or it can evaporate the water off and the water vapor can migrate to the UEA through the air stream. The porous sub-plate 104 can also remove product water from the UEA 28, formed by the reaction at the cathode. Product water in liquid form can be driven directly into the pores of the porous sub-plate 104 by maintaining the pressure in the water management loop 150 below that of the reactants. If product water is in vapor form, it can condense on the porous sub-plate, where it is absorbed back into the circulating water loop.

Thermal management is primarily controlled by a dedicated and isolated coolant loop 152. Coolant pump 154 flows coolant into stack 144 through coolant supply 114g and out of the stack 144 through coolant return 114h. In between, in some configurations, coolant is distributed across surfaces of cell 140. In the illustrated embodiment, coolant flows through internal passage 112, formed by the joining of half-plate 102A and half-plate 102B (FIG. 10). Upon leaving the stack at coolant return 114h, the coolant passes through a heat exchange apparatus 156 whereupon sensible heat is rejected prior to circulating back to the supply 114g. In one example, the heat exchange apparatus 156 is a radiator. A flow control valve or orifice 158 may be used to regulate the coolant flow.

The impermeable property of the nonporous sub-plate 102 eliminates the need for separate coolant tubing, and permits the coolant passage to be located internally to sub-plate 102, which saves space as compared to some designs that add separate cooler plates. As noted earlier, the design allows use of an antifreeze-type coolant, such as a water/ethylene glycol mix (WEG), which is beneficial for fuel cells operating in cold environments.

In the illustrated embodiment, coolant flows through internal passages formed by joining half-plates 102A and 102B. However, other means of distributing coolant are envisioned within the scope of the invention. For example, the internal coolant passage could be defined by a cavity containing a porous substrate that distributes the coolant.

Under most circumstances, external humidifiers are not required in the disclosed embodiments, but there are scenarios in which adding an external humidifier may be beneficial for the system. For example, if the bipolar plate 100 used only passive water management features and was operated in a particularly hot and dry environment, water could evaporate from the porous sub-plate faster than the fuel cell created product water. In such an environment, it may be advantageous to add an external humidifier 159 (FIG. 13) to the system, rather than incorporating active cooling features as detailed in other embodiments herein.

In the illustrated embodiment, there is no porous media in the anode channel 110. In some operating conditions, such as when there are locally cool regions present, moisture can condense in anode channel resulting in water build-up. The water must be periodically removed to prevent performance degradation at the anode electrode. Prior art solutions to this problem include attempting to blow the water out, which involves extra operating steps and consumes parasitic power. In one embodiment, shown in FIGS. 11 and 12, one or more small weep holes 142 may be drilled from the bottom of the hydrogen channel to communicate with the DI water cavity 118. The weep hole 142 may be sized as a bubble barrier to transport excess water from the fuel channel 110 to the water channel 118 without letting the reactant gas escape. The DI water loop pressure can be maintained below the pressure of the anode and the cathode. In this manner, the pressure differential will drive the water build-up through the weep hole 142 into cavity 118, where it is returned to the DI water loop.

As noted above, under typical operating conditions, fuel cell power plant thermal management is primarily controlled by the antifreeze coolant loop 152, with sensible heat being conveyed to the circulating coolant passing through the coolant flow field. To a smaller degree, some cell cooling may be provided by evaporative cooling when the product water in the pores evaporates, but the evaporative cooling function is typically not taken into account as a control parameter in a sensible heat coolant flow system.

Evaporative cooling utilizes the heat of vaporization to provide up to a one hundred-to-one improvement in cooling effectiveness per volume of water as compared to the sensible heat coolant flow method. The inventors of the present disclosure have determined that enhanced cooling can be realized under certain circumstances via evaporation. Thus, in one aspect of the invention, the independent operation of the water management loop and the coolant loop may be utilized to operate a thermal boost mode or a water recovery/accumulation mode.

In the thermal boost mode, additional cooling is required for a finite duration, such as when the stack is demanding a lot of power. In fuel cell vehicles, especially trucks, thermal boost mode may be beneficial when climbing a steep or long roadway grade, or operating at high power on a hot day, or any other scenario where the radiator is not big enough to handle the cooling demand. In thermal boost mode, the thermal management strategy shifts away from sensible cooling towards evaporative cooling to provide greater cooling capacity. Evaporative cooling can account for a greater portion of the total cooling function in thermal boost mode, and in some design scenarios may account for 90% or more.

In operation, when additional cooling is required or calculated to be required, at a first step the coolant flow rate (i.e., WEG) is decreased, which lowers the sensible cooling capacity. As a consequence, the stack temperature begins to rise, the rate of water evaporation from the pores increases, and significant evaporative cooling is realized. At a second step, then, the fuel cell is allowed to increase in temperature or maintain temperature so as to increase the degree of evaporative cooling. To compensate for the increased water evaporation and prevent the pores from drying out and losing their bubble barrier, at a third step the flow rate of water through the water management flow field may be increased. In one example, the increase in water flow rate may be realized by providing a pump-driven circulating water management loop in fluid communication with the water management flow field, and increasing the water flow rate with the pump.

Because the disclosed evaporative cooling scheme has a greater capacity to handle large, short-duration thermal demands, it provides a better short-term thermal management control strategy. The coolant flow rate can be regulated at the lowered value to achieve the appropriate level of evaporative cooling and desired stack temperature.

The disclosed thermal boost mode depletes the water volume in the water management loop—more so than can be simultaneously replenished by product water formation. Thus, the thermal boost mode is intended for relatively short durations. However, in another aspect of the invention, the independent operation of the water management loop and the coolant loop may be utilized to operate a water recovery/accumulation mode. In the water recovery/accumulation mode, the coolant flow (i.e., WEG) is increased above its normal rate to reduce the evaporative cooling and produce excess water by condensation within the cell. The excess product water can be collected and retained for future use in the thermal boost mode.

In one implementation, the water recovery/accumulation mode can be operated during a portion of the cycle that is not demanding on the stack, such as when a vehicle is traveling on level ground, and the air flow through the radiator provides sufficient cooling. At a first step, when additional product water is needed or calculated to be needed, the coolant flow rate (i.e., WEG) in the coolant loop is increased to increase sensible cooling. As a consequence, the stack temperature drops, less product water is evaporated via the pores, and condensate forms instead. At a second step, the fuel cell is allowed to decrease in temperature or maintain temperature so as to condense a surplus of product water. To compensate for the decreased water evaporation and prevent cell flooding, at a third step the flow rate of water through the water management flow field may be decreased. In one example, the decrease in water flow rate may be realized by providing a pump-driven circulating water management loop in fluid communication with the water management flow field, and decreasing the water flow rate with the pump.

In another implementation, the fuel cell controller may receive sensor or environmental inputs to determine if the thermal boost mode or the water recovery/accumulation mode is warranted and if so, to what degree. Non-limiting examples of sensor inputs may include air flow, cathode exhaust temperature, cathode exhaust pressure, total water reservoir capacity, water inventory, water temperature, ambient temperature, coolant return temperature, and water loop exit pressure. The controller may command coolant pump and/or water pump flow settings in response to the sensor input values.

The fuel cell controller may also receive inputs from external environmental factors. Non-limiting examples include payload timing, vehicle route, GPS coordinates, roadway grade, weather forecast, time of day, and driver behavior. In one example, an opportune time to accumulate water for a heavy-duty vehicle may be when the vehicle has little or no payload. Then, when a payload is present, the vehicle may use that excess water to reduce the radiator fan power by evaporating water. In another example, the controller may receive GPS route data that indicates a steep or extended roadway grade is approaching. The controller may command the stack sufficiently in advance to operate the water recovery/accumulation mode to collect product water and retain it in a reservoir. Then, when the vehicle encounters the grade, the controller may command the stack to operate the thermal boost mode.

The operation of the thermal boost mode and water recovery/accumulation mode are not limited to the disclosed hybrid bipolar plate. The inventors envision the disclosed methods of operating may be possible and beneficial in any four-fluid fuel cell power plant in which an antifreeze-type coolant loop is operated independently of a water management loop, such as that disclosed in U.S. Pat. No. 7,135,247. The '247 patent discloses separate, individual cooler plates disposed between every other fuel cell.

The disclosed thermal boost mode and water recovery/accumulation mode provide several benefits and advantages over prior art 3-fluid stacks. One benefit is that the thermal boost mode decreases parasitic power because the radiator and fan are actually tuned down instead of ramped up during high power excursions. In prior art stacks, running the radiator and fan hard penalizes efficiency. Conversely, tuning down the radiator increases efficiency.

Another advantage of the disclosed thermal boost mode is that the size of the radiator may be decreased because there is an alternate means of cooling available that can be achieved within the fuel cell. Prior art 3-fluid designs utilize much larger radiators, which are more expensive and add weight to the vehicle, thereby incurring a performance penalty. This is particularly true for fuel cell trucks.

Figure 14:
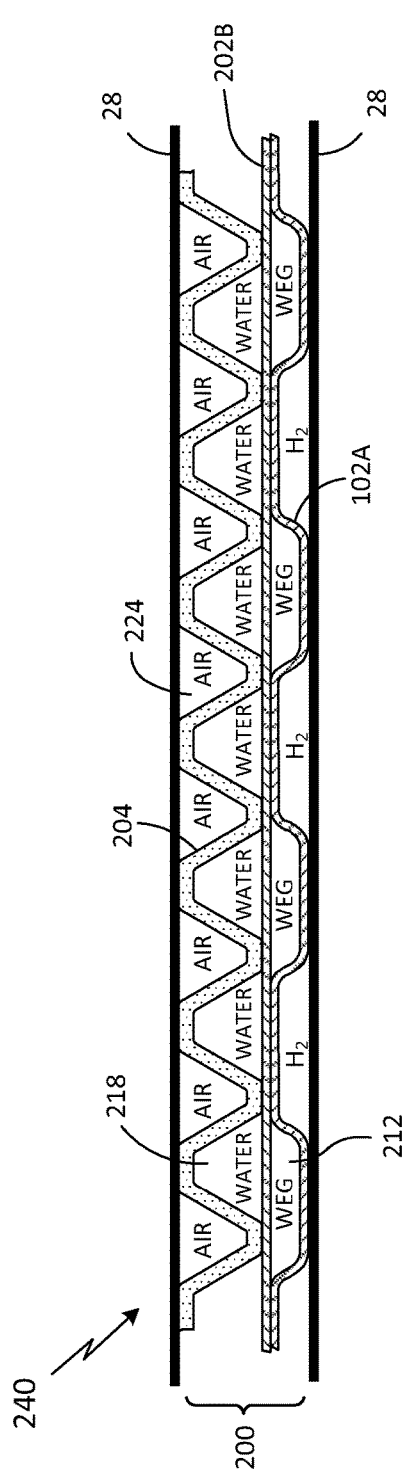
FIG. 14 depicts a section view of a fuel cell with a bipolar plate according to a second embodiment of the invention.

FIG. 14 depicts a section view of a fuel cell 240 having a four-fluid bipolar plate 200 according to a second embodiment of the invention. Half-plate 102A may be the same construction as that depicted in FIG. 11, but half-plate 102B is replaced by a simple flat plate 202B. The flat plate may be formed from the same material as half-plate 102A. The porous sub-plate 204 in this embodiment includes oxidant flow field channels 224 on a first side of the plate and DI water channels 218 on an opposing second side. In this construction, the nonporous sub-plate 102 does not have water channels. One advantage to this embodiment is that it is lower profile, which reduces stack height and weight. The size of the WEG coolant passages 212 are also reduced by half, but this can be compensated for by increasing the coolant flow.

Figure 15:
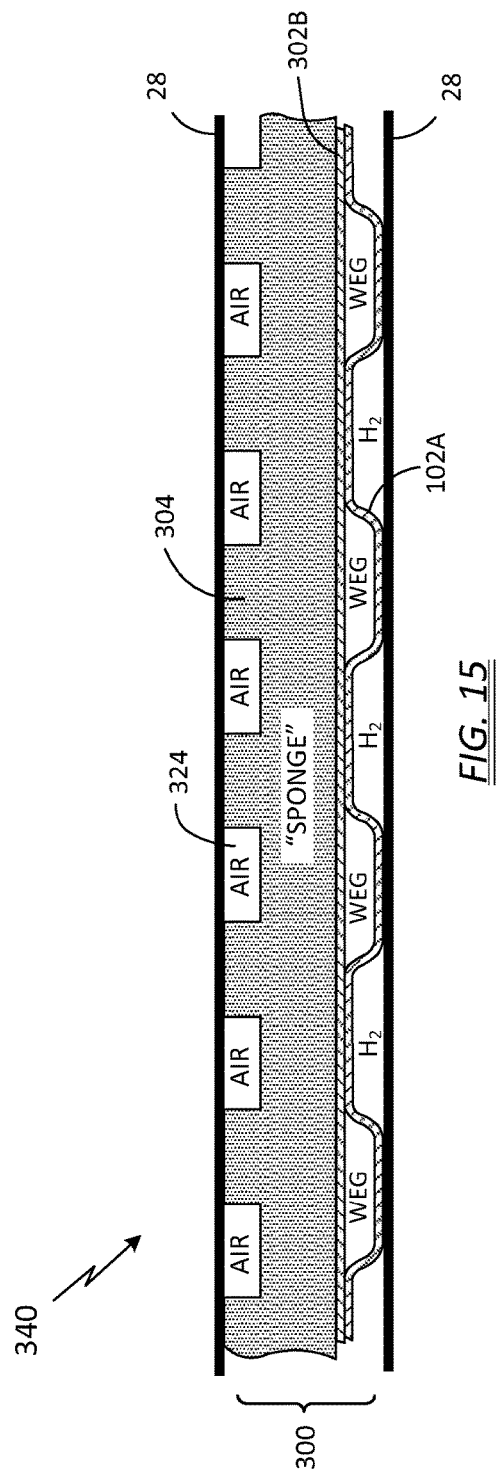
FIG. 15 depicts a section view of a fuel cell with a bipolar plate according to a third embodiment of the invention.

FIG. 15 depicts a section view of a fuel cell 340 having a four-fluid bipolar plate 300 according to a third embodiment of the invention. In this embodiment, the DI water does not circulate throughout the stack—the water only circulates in the cell 340. Half-plate 102A may be the same construction as that depicted in FIG. 11, but half-plate 102B is replaced by a simple flat plate 302B. The flat plate may be formed from the same material as half-plate 102A. The sub-plate 304, which may be constructed as a water transport plate, functions as a porous substrate for DI water; in effect a DI water "sponge": it collects product water and humidified water from the air, circulates it back to the entrance of the cell reactant channel 324, and hydrates the UEA 28. The in-cell circulation occurs by pore wicking—as the water in the pores evaporates at the reactant channel entrance, fresh water is wicked from farther down the channel 324 where the pores are still saturated. The cycle continues passively, with evaporation taking place at the channel entrance and condensation occurring at the channel exit. This embodiment offers the advantage of passive water management, which is less complicated, saves the expense of external pumps and plumbing, and does not consume parasitic power.

Figure 16:
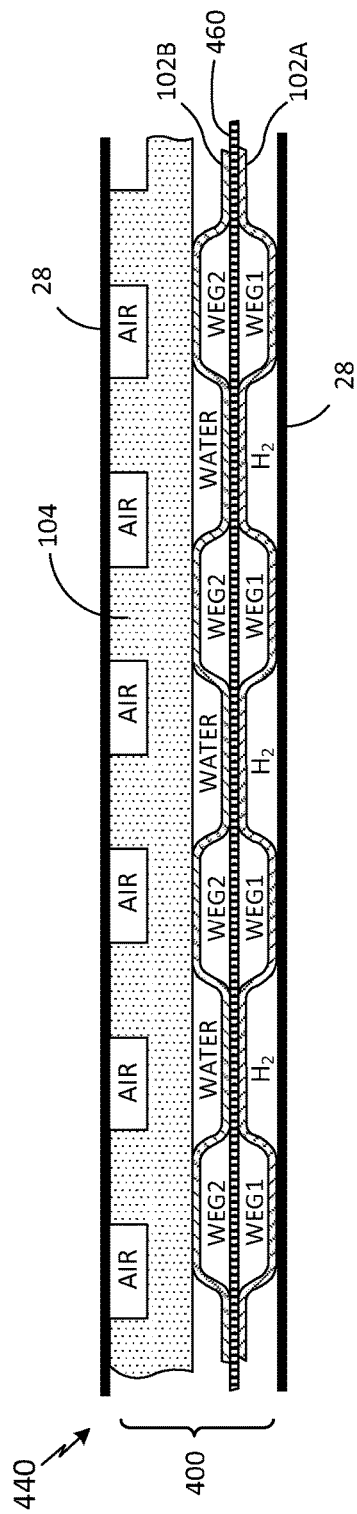
FIG. 16 depicts a section view of a fuel cell with a bipolar plate according to a fourth embodiment of the invention.

FIG. 16 depicts a section view of a fuel cell 440 having a four-fluid bipolar plate 400 according to a fourth embodiment of the invention. In this embodiment, the construction is essentially the same as that depicted in FIG. 11, except an additional separator plate 460 divides the internal WEG coolant passage into two separate channels (shown as WEG1, WEG2). The separate channels could be used to even out the heat distribution across the cell, i.e., adding more cooling capacity where needed. In one example, the two separate channels could carry different compositions of coolant or different fluids entirely.

Figure 17:
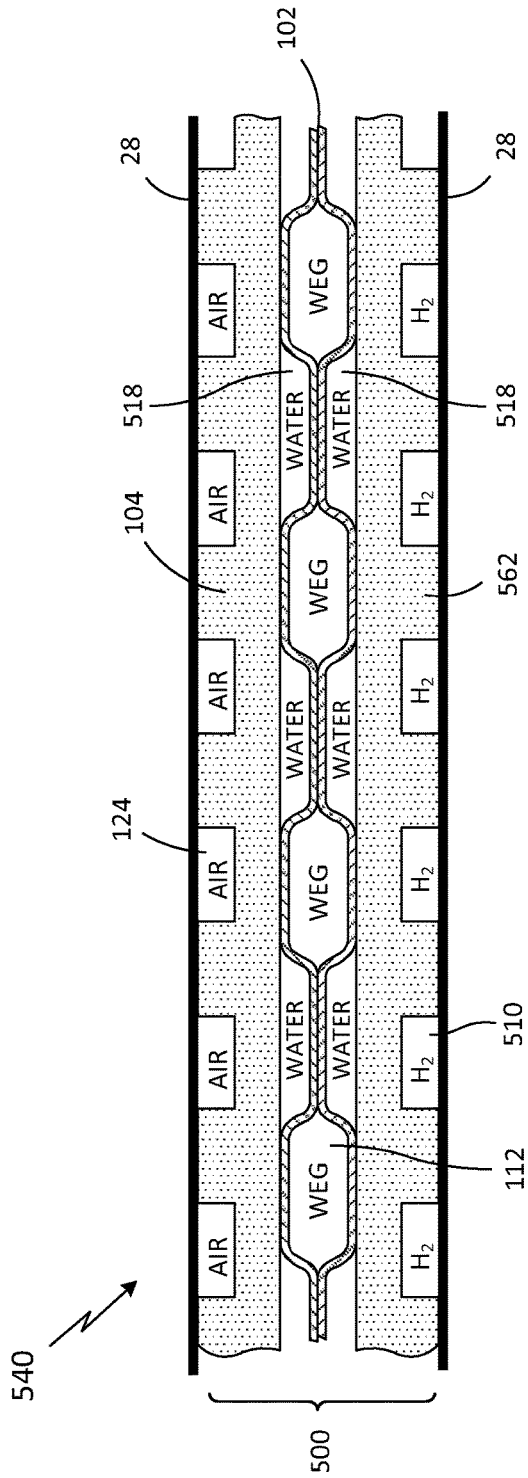
FIG. 17 depicts a section view of a fuel cell with a bipolar plate according to a fifth embodiment of the invention.

FIG. 17 depicts a section view of a fuel cell 540 having a four-fluid bipolar plate 500 according to a fifth embodiment of the invention. In this embodiment, the cathode-side construction and WEG internal coolant passages are essentially the same as that depicted in FIG. 9, but the anode-side utilizes a porous sub-plate 562 to supply hydrogen to the UEA 28. The nonporous sub-plate 102 is unchanged, but instead of the valleys 132 in sub-plate 102A defining fuel reactant channels (FIG. 8), in this embodiment they define water channels 518 to keep the porous anode sub-plate 562 hydrated. Similar to the cathode-side, the porous anode sub-plate 562 includes fuel flow field channels 510 that abut the UEA 28.

Figure 18:
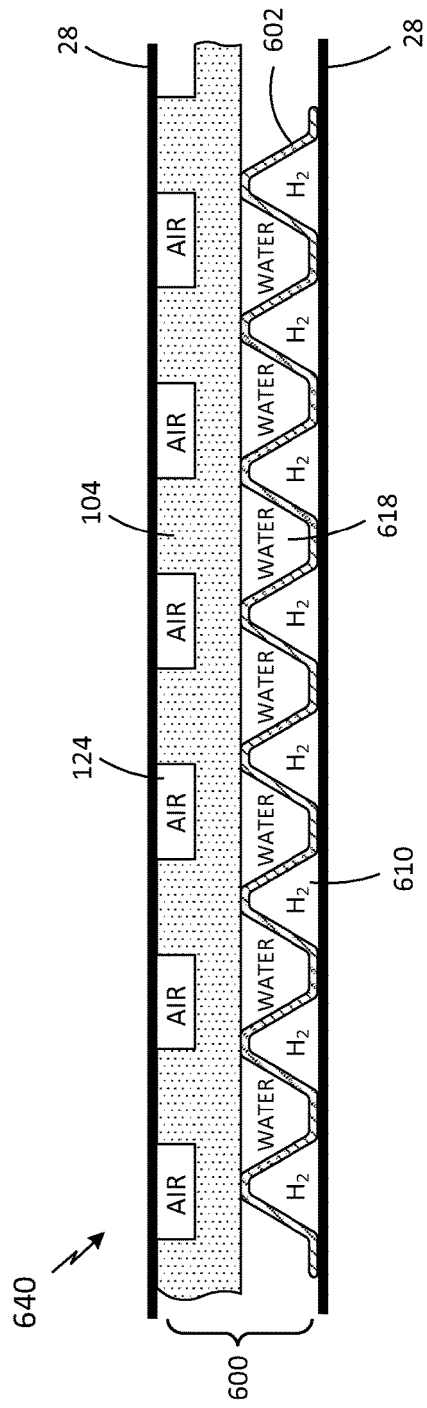
FIG. 18 depicts a section view of a fuel cell with a bipolar plate according to a sixth embodiment of the invention.

FIG. 18 depicts a section view of a fuel cell 640 having a bipolar plate 600 according to a sixth embodiment of the invention. This embodiment is a 3-fluid system, as it does not include the internal coolant passages for WEG coolant. The bipolar plate does include a nonporous sub-plate 602 and a porous sub-plate 104. The porous sub-plate is essentially the same as that depicted in FIG. 11. The nonporous sub-plate 602 differs from previous embodiments in that it comprises a single plate, and there is no flat plate welded or otherwise joined to it. Accordingly, the sub-plate 602 includes a water management side defining water channels 618, and an opposing reactant side defining fuel flow field channels 610.

Figure 19:
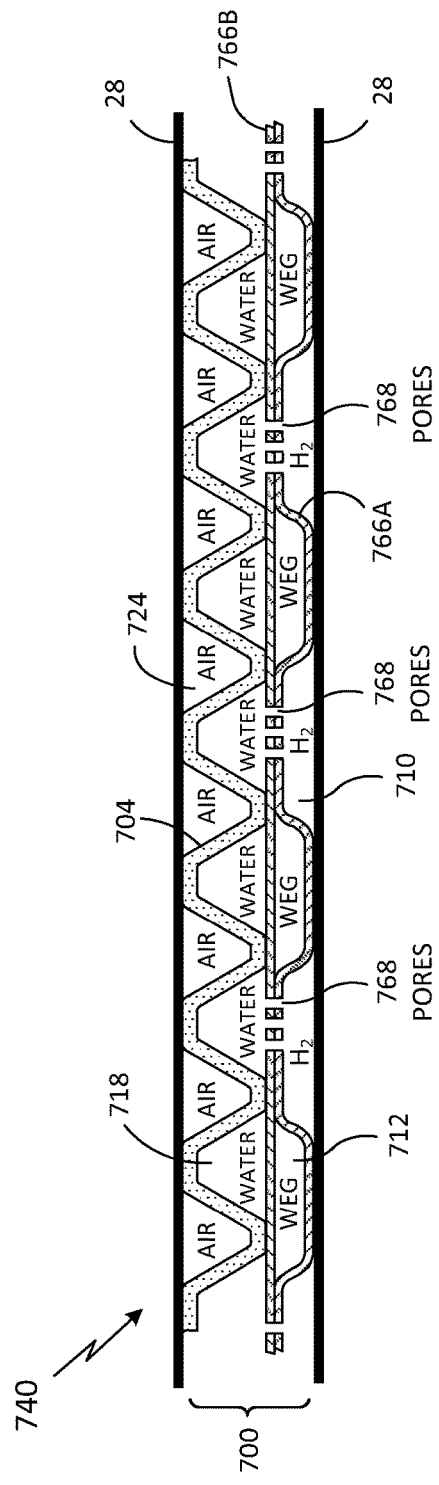
FIG. 19 depicts a section view of a fuel cell with a bipolar plate according to a seventh embodiment of the invention.

FIG. 19 depicts a section view of a fuel cell 740 with a four-fluid bipolar plate 700 according to a seventh embodiment of the invention. In this embodiment, the bipolar plate 700 includes a porous sub-plate 704 on the cathode side and a hybrid sub-plate 766 on the anode side. Sub-plate 704 may be essentially the same as sub-plate 204 (FIG. 14), having an oxidant flow field 724 on one side and a water flow field 718 on an opposing side. Hybrid sub-plate 766 includes a porous portion and a non-porous portion. The non-porous portion defines internal coolant passages 712 that isolate a coolant from exposure to other cell components. The coolant may be an antifreeze-type coolant, such as WEG. The porous portion defines a plurality of pores 768 fluidly connecting the fuel reactant flow field 710 to the water flow field 718. The pores 768 are sized as a bubble barrier to transport excess water from the fuel flow field 710 to the water flow field 718 without letting the hydrogen gas escape into the water cavity.

In one example, sub-plate 766 may include half-plate 766A (similar to 102A in FIG. 8) joined to half-plate 766B (similar to 202B in FIG. 14) to form the internal coolant passages 712. The flat plate 766B may be formed from the same material as half-plate 766A. The half-plates 766A, 766B may be joined by any of the previously mentioned techniques, such as welding, laser welding, brazing, thermoplastic bonding, or adhesives, for example. After joining, the pores 768 may be formed by any suitable technique, such as laser-drilling.

Further embodiments may be realized by swapping the fuel and oxidant reactants. For example, previous embodiments described air flowing through the channels in the porous sub-plate 104, and hydrogen flowing through the channels in the nonporous sub-plate 102. It is contemplated within the scope of the invention to exchange locations, meaning hydrogen flows through the channels in the porous sub-plate 104, and air flows through the channels in the nonporous sub-plate 102.

One of the improvements of the disclosed fuel cell system is the prevention of galvanic corrosion on the nonporous metal sub-plate. Galvanic corrosion can occur at an interface 164 (FIGS. 11 and 13) between the porous carbon sub-plate and metal sub-plate due to their electropotential difference. As the metal begins to oxidize, the cell begins to lose performance because the oxide layer is nonconductive. Prior art solutions to this problem (where the system included nonporous carbon) include the application of a coating on the metal plate to prevent the corrosion. Although the disclosed fuel cell system may still benefit from coatings, the system may not need to utilize them because the demineralized/deionized water loop sweeps over the interface 164 between metal and carbon, and carries away any corrosion products that might normally accumulate and make the interface nonconductive. In effect, water circulating at that interface prevents oxides from accumulating.

While the present invention has been described with reference to a number of specific embodiments, it will be understood that the true spirit and scope of the invention should be determined only with respect to claims that can be supported by the present specification. Further, while in numerous cases herein wherein systems and apparatuses are described as having a certain number of elements it will be understood that such systems and apparatuses can be practiced with fewer than the mentioned certain number of elements. Also, while a number of particular embodiments have been described, it will be understood that features and aspects that have been described with reference to each particular embodiment can be used with each remaining particularly described embodiment. A sample of methods that are described herein are as follows:

(1) A method of preventing corrosion at a carbon/metal interface in a fuel cell, the method comprising the steps of:

Providing a bipolar plate comprising a metallic sub-plate and a porous sub-plate, the metallic sub-plate having at least one water management side and the porous sub-plate having a reactant side and an opposing water management side, the water management side of the porous sub-plate in abutment with the water management side of the metallic sub-plate so as to create an interface;

Providing a unitized electrode assembly in abutment with the bipolar plate;

Flowing fuel and oxidant reactants from reactant flow fields on the bipolar plate to the unitized electrode assembly to initiate an electrochemical reaction;

Flowing water through a water management loop to the water management side of the metallic sub-plate and the porous sub-plate so as to sweep away corrosion products formed at the interface; and Deionizing and demineralizing the water flowing in the water management loop.

(2) The method of preventing corrosion at a carbon/metal interface in a fuel cell as described in (1) above, further comprising the steps of forming an internal coolant passage within the bipolar plate, and flowing an antifreeze-type coolant through the internal coolant passage.

(10) A method of operating a four-fluid fuel cell in thermal boost mode, comprising the steps of:

Providing a four-fluid fuel cell comprising an oxidant flow field, a fuel reactant flow field, a water management flow field, and an independent circulating coolant loop operable to remove sensible heat, the coolant loop in fluid communication with a coolant flow field;

Decreasing a flow rate of coolant in the coolant loop to lower the sensible cooling capacity; and Allowing the fuel cell to maintain or increase in temperature so as to increase evaporative cooling.

(11) The method of operating a four-fluid fuel cell as described in (10) above, wherein the coolant is an antifreeze-type coolant.

(12) The method of operating a four-fluid fuel cell as described in (10) above, wherein at least one of the oxidant flow field and the fuel reactant flow field comprise a plurality of pores fluidly connected to the water management flow field, the pores configured as a bubble barrier.

(13) The method of operating a four-fluid fuel cell as described in (10) above, wherein the step of providing a four-fluid fuel cell comprises providing a hybrid bipolar plate comprising an oxidant flow field, a fuel reactant flow field, an internal coolant passage, and a water management flow field.

(14) The method of operating a four-fluid fuel cell as described in (10) above, further comprising a step of increasing a flow of water through the water management flow field to compensate for the increased evaporation.

(15) The method of operating a four-fluid fuel cell as described in (14) above, wherein the step of providing a four-fluid fuel cell further includes providing a circulating water management loop in fluid communication with the water management flow field.

(20) A method of accumulating and retaining product water in a four-fluid fuel cell, comprising the steps of:

Providing a four-fluid fuel cell comprising an oxidant flow field, a fuel reactant flow field, a water management flow field, and an independent circulating coolant loop operable to remove sensible heat, the coolant loop in fluid communication with a coolant flow field;

Increasing a flow of coolant in the coolant loop to increase sensible cooling; and Allowing the fuel cell to maintain or decrease in temperature so as to condense a surplus of product water.

(21) The method of accumulating and retaining product water in a four-fluid fuel cell as described in (20) above, further comprising the steps of providing a water reservoir to store the surplus of product water, the water reservoir in fluid communication with the water management loop.

(22) The method of accumulating and retaining product water in a four-fluid fuel cell as described in (20) above, further comprising a step of decreasing a flow of water through the water management flow field to accumulate the surplus of product water and compensate for decreased evaporation.

(23) The method of accumulating and retaining product water in a four-fluid fuel cell as described in (22) above, wherein the step of providing a four-fluid fuel cell further includes providing a circulating water management loop in fluid communication with the water management flow field.

(24) The method as described in either (10) or (20) above, wherein a controller commands coolant pump and water pump flow settings responsive to sensor data, the sensor data comprising at least one of air flow, cathode exhaust temperature, cathode exhaust pressure, total water reservoir capacity, water inventory, water temperature, ambient temperature, coolant return temperature, and water loop exit pressure.

(25) The method as described in either (10) or (20) above, wherein a controller commands coolant pump and water pump flow settings responsive to environmental factors, the environmental factors comprising at least one of payload timing, vehicle route, GPS coordinates, roadway grade, weather forecast, time of day, and driver behavior.

We claim:

1. A bipolar plate for a fuel cell, comprising:
   a nonporous sub-plate comprising a water management side, an opposing reactant side, and an internal coolant passage therebetween; and
   a porous sub-plate comprising a reactant side and an opposing water management side, the reactant side comprising a first reactant flow field, and the water management side fluidly connected to the water management side of the nonporous sub-plate.

2. The bipolar plate according to claim 1, wherein the reactant side of the nonporous sub-plate comprises a second reactant flow field.

3. The bipolar plate according to claim 2, wherein the water management side of the nonporous sub-plate comprises a water flow field.

4. The bipolar plate according to claim 3, wherein the water flow field comprises channels.

5. The bipolar plate according to claim 1, wherein the internal coolant passage of the nonporous sub-plate is subdivided into a primary pathway and a secondary pathway.

6. The bipolar plate according to claim 5, wherein the nonporous sub-plate further comprises a divider to separate the primary pathway from the secondary pathway.

7. The bipolar plate according to claim 2, wherein the first reactant flow field in the porous sub-plate comprises oxidant channels, and the second reactant flow field in the nonporous sub-plate comprises fuel channels.

8. The bipolar plate according to claim 1, wherein the water management side of the porous sub-plate comprises a water flow field.

9. The bipolar plate according to claim 8, wherein the water flow field comprises channels.

10. The bipolar plate according to claim 8, wherein the water flow field comprises a pore structure configured as a water reservoir to facilitate passive water migration across the fuel cell.

11. The bipolar plate according to claim 8, wherein the water flow field comprises a bubble barrier pore structure adapted to permit liquid transport through the pore structure and prevent reactant gas transport through the pore structure.

12. The bipolar plate according to claim 1, wherein the water management side of the nonporous sub-plate comprises a recessed perimeter adapted to provide a nested seal with the porous sub-plate.

13. The bipolar plate according to claim 1, wherein the nonporous sub-plate comprises a first half-plate joined to a second half-plate.

14. The bipolar plate according to claim 13, wherein the internal coolant passage is defined by the joined first half-plate and second half-plate.

15. The bipolar plate according to claim 1, wherein the nonporous sub-plate further comprises at least one weep hole fluidly connecting the reactant side to the water management side, the at least one weep hole configured as a bubble barrier to transport excess water from the reactant side to the water management side while inhibiting transport of reactant gas.

* * * * *